(12) United States Patent
Volkmann

(10) Patent No.: US 8,157,483 B2
(45) Date of Patent: Apr. 17, 2012

(54) METHOD AND DEVICE FOR RENDERING VACUUM CONVEYORS INERT

(75) Inventor: Thilo Volkmann, Soest (DE)

(73) Assignee: Volkmann GmbH, Soest (DE)

( * ) Notice: Subject to any disclaimer, the term of this patent is extended or adjusted under 35 U.S.C. 154(b) by 513 days.

(21) Appl. No.: 11/587,327

(22) PCT Filed: Apr. 20, 2005

(86) PCT No.: PCT/EP2005/004229
§ 371 (c)(1),
(2), (4) Date: Sep. 5, 2007

(87) PCT Pub. No.: WO2005/102882
PCT Pub. Date: Nov. 3, 2005

(65) Prior Publication Data
US 2008/0145155 A1 Jun. 19, 2008

(30) Foreign Application Priority Data
Apr. 20, 2004 (DE) .......................... 10 2004 019 703

(51) Int. Cl.
*B65G 53/60* (2006.01)
(52) U.S. Cl. .......................... 406/168; 406/134; 406/171
(58) Field of Classification Search .................. 406/168, 406/169, 171, 109, 134, 136, 138, 172, 86, 406/90, 91
See application file for complete search history.

(56) References Cited

U.S. PATENT DOCUMENTS

| | | | | |
|---|---|---|---|---|
| 305,976 A * | 9/1884 | Smith | ........................... | 406/120 |
| 1,971,852 A * | 8/1934 | Goebels | ........................ | 366/107 |
| 2,509,984 A | 5/1950 | Morrow | | |
| 3,069,205 A * | 12/1962 | McIver et al. | ................... | 406/15 |
| 3,289,396 A * | 12/1966 | Anderson | ..................... | 55/385.1 |
| 3,480,330 A * | 11/1969 | Hirs et al. | ...................... | 406/172 |
| 3,489,464 A * | 1/1970 | Delfs | ............................. | 406/28 |
| 3,521,430 A * | 7/1970 | Vanderlip et al. | ............... | 55/283 |
| 3,619,011 A * | 11/1971 | Doble | ........................... | 406/129 |
| 3,645,583 A * | 2/1972 | Heath | ........................... | 406/138 |
| 3,653,188 A * | 4/1972 | Fisher et al. | .................... | 55/283 |
| 3,822,919 A | 7/1974 | Strom | | |
| 4,127,307 A * | 11/1978 | Bentzen-Bilkvist | .......... | 406/109 |
| 4,223,044 A * | 9/1980 | Se | ................................. | 426/318 |
| 4,264,243 A * | 4/1981 | Bentzen-Bilkvist | .......... | 406/169 |
| 4,372,713 A * | 2/1983 | Kean, Jr. | ....................... | 406/172 |
| 4,637,473 A * | 1/1987 | Gillis et al. | ..................... | 169/61 |
| 5,022,328 A * | 6/1991 | Robertson | ..................... | 110/232 |
| 5,030,037 A * | 7/1991 | Sisk | ................................ | 406/91 |

(Continued)

FOREIGN PATENT DOCUMENTS
EP 0 630 838 12/1994
(Continued)

*Primary Examiner* — Gene Crawford
*Assistant Examiner* — William R Harp
(74) *Attorney, Agent, or Firm* — Fay Sharpe LLP

(57) ABSTRACT

Disclosed is a method for rendering vacuum conveyors inert, the vacuum conveyors including at least one intake device (30), a discharge device (40), a separating vessel (100), a vacuum pump device (20), and a system for feeding inert fluid into the separating vessel (100). An inert fluid is fed into the at least one separating vessel (100) below the free surface of a separated material (102) during inertization. A corresponding vacuum conveyor (10) which can be rendered inert includes a system for feeding inert fluid below the free surface (103) of a separated material on and/or in the at least one separating vessel (100).

14 Claims, 3 Drawing Sheets

U.S. PATENT DOCUMENTS

| | | | |
|---|---|---|---|
| 5,053,063 A * | 10/1991 | Sisk | 55/304 |
| 5,071,290 A * | 12/1991 | Johnson | 406/171 |
| 5,489,166 A * | 2/1996 | Schmit | 406/137 |
| 6,068,429 A * | 5/2000 | Schultheis | 406/172 |
| 6,325,572 B1 | 12/2001 | Dietrich | |
| 6,601,653 B2 * | 8/2003 | Grabow et al. | 169/16 |
| 2003/0077128 A1 | 4/2003 | Williams et al. | |

FOREIGN PATENT DOCUMENTS

| | | |
|---|---|---|
| EP | 0 937 004 | 4/1998 |
| WO | WO 83/03593 | 10/1983 |

* cited by examiner

METHOD AND DEVICE FOR RENDERING VACUUM CONVEYORS INERT

FIELD OF INVENTION

The invention pertains to a method for rendering vacuum conveyors inert, said vacuum conveyors featuring at least one intake device, a discharge device, a separating vessel, a vacuum pump device, and a means for feeding inert fluid into the separating vessel, and pertains to a correspondingly equipped vacuum conveyor which can be rendered inert.

BACKGROUND OF THE INVENTION

A vacuum conveyor transports material powder, granulate, dust, tablets, small parts etc, in a suction gas flow, as a rule, air or inert gas.

Material is taken in from a feed location, e.g., with a hand-held suction line, feed funnel or similar, transported through a hose or pipe, and reaches the vacuum conveyor by means of an intake opening. In the vacuum conveyor, an inserted filter element, aided by centrifugal force and sedimentation, separates the transported material from the suction gas. The transported material is collected in the separating vessel of the vacuum conveyor. The filtered suction gas flow is diverted from the separating vessel to flow through the vacuum pump driving the conveying process. Said vacuum pump commonly is installed in a stationary manner directly on the upper part of the vacuum conveyor or in the immediate vicinity thereof and is to be protected—even independently of protecting the environment—from contamination. After the process of filling the separating vessel has been carried out, the vacuum pump is switched off or the suction gas flow between the separating vessel and vacuum pump is interrupted by means of a valve mounted on the filtered clean side or gas side For a standard vacuum conveyor, a discharge valve mounted at the bottom of the separating vessel now opens and the transported material falls out of the separating vessel through the discharge opening Bridging materials can be fluidized as an aid, or pushed out of the separating vessel with overpressure. The filter is cleaned of adhering filter residue by means of a counter blow from the clean gas side. The duration of individual intake and discharge cycles commonly is controlled by means of a sequence control system having adjustable intake and discharge times. Intake and discharge times for a vacuum conveyor commonly are relatively short and, as a rule, are only several seconds each. Since filter residue can be cleaned very frequently, this brief cycle time permits an extremely compact structure having extremely small filtering surfaces in comparison to the inflow velocity in a conventional air-filter installation.

If solid matter is conveyed in the suction gas flow, then a separation of electrical charge can occur due to contact of individual material particles with one another and also due to contact with the conveyor lines. In this connection, the material and also the contacted surfaces receive an electrostatic charge, resulting in the risk of ignition by means of various types of electric discharge for ignitable solid matter or present combustible gases as well as mixtures thereof. Said effect can be counteracted in a vacuum conveyor by means of suitable grounding measures. Gaining acceptance in particular are solutions featuring a completely, constantly electrically conductive separating vessel. Hose assemblies should be equipped with wire spirals grounded at both ends connected to the separating vessel via metal, for example, a clamp. In the conveyor itself, all electrically conductive parts are connected to one another in an electrically conductive manner and are grounded, so the risk of a spark discharge in the conveyor can be minimized and essentially ruled out.

However, conveyed material itself retains a charge that can be dissipated only slowly by means of the vessel wall of the separator or by means of atmospheric moisture. Also, a risk of explosion originates from the filter residue adhering to the filter of the separator—with sufficiently great quantities of charge, the surface charge can lead to so-called brush discharges.

According to current science, brush discharges for solid matter having a minimum ignition energy MIE greater than 1 mJ are not capable of ignition, such that a vacuum conveyor for solid matter having an MIE greater than 1 mJ generally can be utilized. However, for safety reasons, the quantity of matter per conveying cycle is limited to a mass of approximately 10 kg in order to prevent larger build-ups of charge.

However, if combustible gases or gases which support a combustion process, such as oxygen, are present in the surroundings, even lower energy levels are sufficient to ignite said gases. In said cases, inertization regularly is selected as a measure of explosion protection. In this connection, the oxygen content in particular is reduced to a non-critical level for the respective application and replaced by means of a suitable inert fluid. Examples include $N_2$, $CO_2$, or noble gases.

For an inertization process for vacuum conveyors known from the state of the art according to EP 0 937 004 B1, material is taken from a feed point into the separating vessel of a conveyor, the intake opening of the vacuum conveyor is closed and the separating vessel of the conveyor is evacuated to a sufficiently high vacuum. The vacuum pump device is then isolated from the separating vessel by means of a valve and the separating vessel is rendered inert from the clean gas side of the filter.

In order to ensure that a nearly complete gas exchange has occurred and the oxygen content thus reduced to a non-critical level, an inertization process occurring three times in succession has gained acceptance among known methods. This means that after the intake of material has taken place, the separating vessel is evacuated three times and rendered inert in order to ensure a gas exchange above the separated material, in particular. The material is subsequently discharged under a nitrogen blanketing. A disadvantage of the previous method therefore lies in the fact that in order to ensure non-critical oxygen content in the gas or fluid present in the separating vessel, time-intensive multiple inertizations must take place.

It now has been established that the inert fluid fed into a separating vessel above the separated material has little interaction with the volume of separated material and the risk exists that oxygen present in the gap volume and/or pore volume of the separated material is not exchanged at all or is only incompletely exchanged with the inert fluid with the aid of the aforementioned inertization process.

SUMMARY OF THE INVENTION

With this background, the underlying purpose of the invention is to make available a process and a device for rendering vacuum conveyors inert, which ensures that the entire separating vessel and the surroundings of the separated material in particular are nearly completely rendered inert.

In order to solve this problem, a method of the aforementioned type is proposed in which, during the process of inertization, an inert fluid is fed into the at least one separating vessel below the free surface of a separated material.

The root idea of flowing through the material present in a separating vessel with an inert fluid can be realized in multiple ways. In each case an exchange of the combustible gas or of the oxygen with the inert fluid is achieved not only above the separated material, but to the contrary, due to a difference in pressure in particular, inert gas flows through the separated material from below in an upward direction in particular, with the entire inertization process preferably being determined by means of a continuous feed as well as an evacuation of the inert fluid. Among other things, the invention can eliminate multiple cycles for rendering a separating vessel inert and the vacuum conveying process can be accelerated substantially.

In order to construct a suitable differential pressure and simultaneously to remove combustible gas and/or oxygen from the separating vessel, a pressure lower than the pressure of the inert fluid is generated or maintained in the at least one separating vessel during the inertization process by a vacuum pump device mounted, in particular, above the separated material, or else the feed pressure of the inertization device is selected to be sufficiently high that, for a vacuum pump device that is switched off and can be freely flowed through or for a bypass valve which is switched on, there is the presence of a sufficient flow-through or fluidization of the conveyed product.

In order to enable a space saving arrangement of the inert fluid feed and a particularly effective explosion protection, inert fluid is fed into the at least one separating vessel in the immediate proximity of and, in particular, above the discharge opening.

In order to ensure a nearly complete flow-through of the separated material and of the remaining volume of a separating vessel with inert fluid, as well as of the filter and of filter residue adhering to said filter, inert fluid fed into said separating vessel by means of a line, a valve-controlled line in particular, flows through the filter in the direction of the clean gas side where it exits the separating vessel.

In order to keep the time for inertization as brief as possible and in order to reduce the operating steps necessary for this, inertization can occur within the scope of a process characterized by means of a continuous feed of inert fluid and by means of the simultaneous, continuous evacuation of the separating vessel.

In order to constantly monitor the content of oxygen, in particular during inertization, and in order to use this information, if necessary, in order to control said inertization, the oxygen concentration of the fluid present in the at least one separating vessel is measured, in particular, in an area of the clean gas side.

In order to allow utilization in the most flexible way possible, the method according to the invention may be combined in a suitable manner with a conventional inertization step that, rather than conducting flow through the separated material, conducts flow through the filter in particular, from the direction of the clean gas side.

A further aspect of the invention consists in making available a vacuum conveyor which ensures a thorough inertization of the separating vessel and ensures that the separated material in particular is nearly completely subjected to inertization.

In order to solve this problem, a device of the aforementioned type is proposed for which the means for feeding inert fluid below the free surface of the material to be separated are provided on and/or in the at least one separating vessel.

In order to ensure a controlled and effective feed of inert fluid into the separating vessel, the means for feeding inert fluid are in the form of fluid nozzles.

In order to control the feed of inert fluid at any time and, if necessary, to be able to adjust the quantity of inert fluid, the lines which conduct the feeding means are controllable via valves.

In order to bring the feeding means for inert fluid into an optimal position with regard to a flowing through of the separated material and additionally, in this connection, in order to ensure a compact structure, the feeding means are provided in and/or on the vessel wall and/or in the discharge lid belonging to the discharge device.

In order to bring the inert fluid into the optimal position with regard to a flowing through of the separated material, the areas of the vessel wall in which the fluidizing nozzles are provided are arranged in a diagonal progression downward, preferably with an aperture angle of 30-75°. However, this funnel-shaped area can be omitted, with smaller vessel diameters of up to 450 mm in particular, such that a cylindrical surface is yielded on which are arranged the inertization devices. A discharge valve that seals the entire diameter of the vessel can close the vessel from below.

In order to ensure the most effective flow-through of the separated material, several feeding means are arranged in a structure, in a ring structure in particular, that corresponds to the geometry of the separating vessel, to the peripheral shape thereof in particular. For a small vessel diameter, an individual feeding means mounted only on one side is also possible according to the invention.

The aforementioned components as well as those claimed and described in the embodiments to be used according to the invention underlie no particular exceptional circumstances with regard to size, configuration, material selection or technical conception such that the selection criteria known in the sphere of application can find unlimited application.

Additional details, features and advantages of the method of the invention are given in the dependent claims and from the following description of the associated drawing in which is represented an example of an embodiment of the method according to the invention for rendering vacuum conveyors inert.

BRIEF DESCRIPTION OF DRAWINGS

The drawing shows in detail:
Embodiments
FIG. 1 A block diagram in schematic vertical section view of a vacuum conveyor with separating vessel, vacuum pump device and intake device.

DETAILED DESCRIPTION

Figure 1:
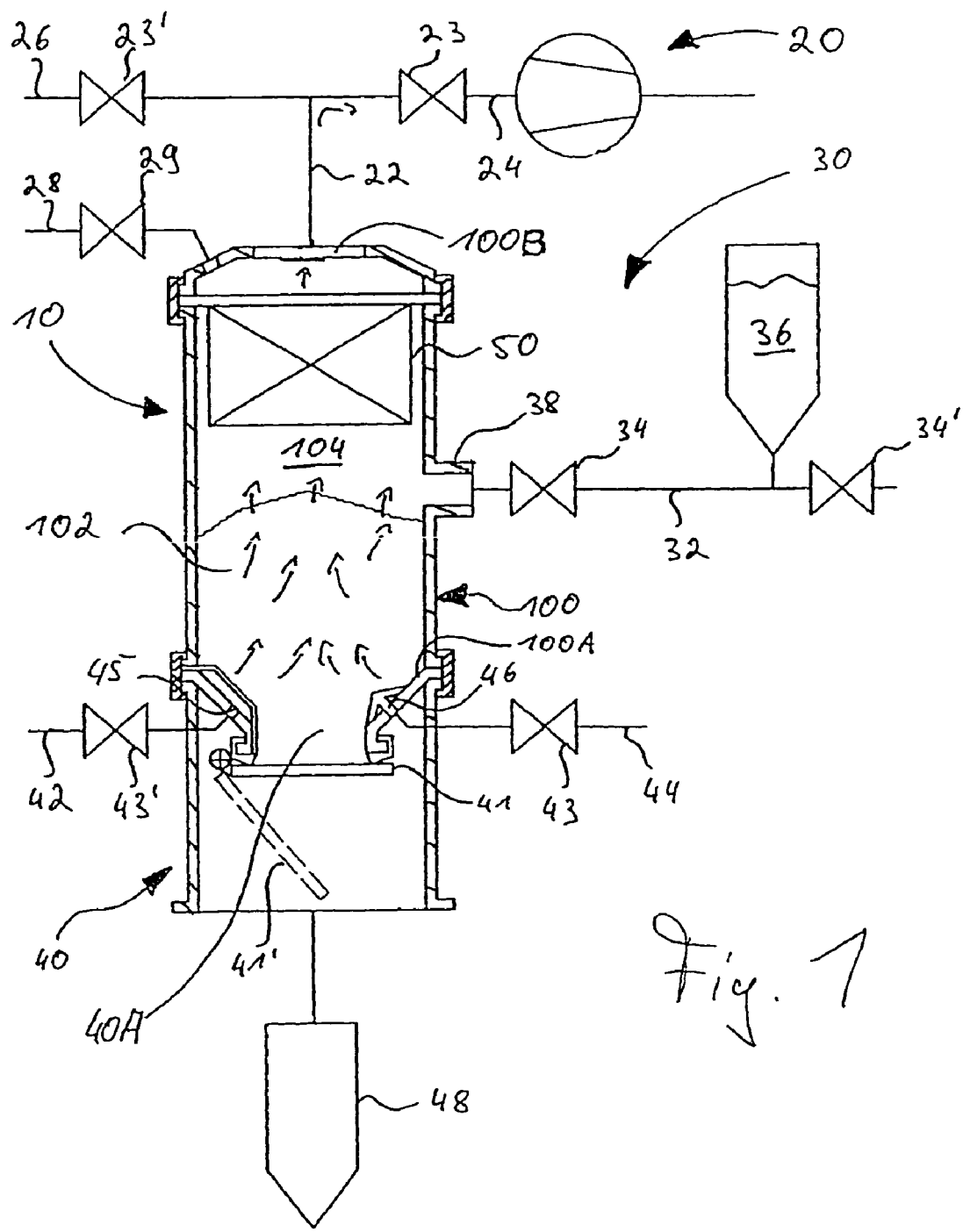

The block diagram evident from FIG. 1 of a vacuum conveyor (10) comprises a separating vessel (100), a vacuum pump device (20), an intake device (30) and also a discharge device (40). The intake device is composed in essence of a line (32) that can be controlled by means of valves (34, 34') and which leads to material (36) to be taken up, with the connection to the separating vessel (100) being produced by means of an intake opening (38). The vacuum required for intake is generated by means of a vacuum pump device (20)

which, by means of lines (22, 24) controlled by means of a valve (23), is in a fluid-tight connection with an intake opening (100B) in the upper part of the separating vessel (100). Joined to the line (22) and controlled by a valve (23') is an additional line (26), the function of which is described below.

Within the separating vessel (100), a filter (50) filters the taken-up conveying fluid of dust or particles such that the latter cannot reach the vacuum pump device (20). Provided in the upper part of the separating vessel (100) is an additional opening, to which is joined a line (28), controlled by means of a valve (29); said line conducts the fluid within the separating vessel (100) further on to a corresponding measuring apparatus, with the aid of which, e.g., the oxygen content can be determined. Also sufficient is only one opening in the vessel lid, which connects all other devices by means of a collecting line. This can simplify maintenance and repair work on the separator (smaller masses to handle). Located in the lower region of the separating vessel is a discharge device (40), which in the embodiment represented in FIG. 1 is in the form of a pivoting discharge lid (41) that can be closed and opened (41'). Located in immediate proximity to the discharge opening (40A) are lines (42, 44), controlled by valves (43, 43'), which terminate, e.g., at the vessel wall (100A) in fluidizing nozzles (45, 46). The position of said nozzles (45, 46) is selected such that the outlets of same are located below the free surface of the separated material (103) and consequently, an inert fluid flowing through the lines (42, 44) and emerging through the nozzles (45, 46), due to the possible inert fluid pressure and/or due to the vacuum produced by the vacuum pump device (20), also completely flows through the volume of separated material (102) and subsequently displaces in the chamber volume the fluid (104) located above the separated material (102) and featuring a residual oxygen content, and also flows through the filter (50) in order finally to exit the separating vessel (100) by means of a dedicated outlet opening (100B). Said inertization process can take place continuously. The flow progression is indicated with arrows in FIG. 1. Not until a vacuum cleaning with inert fluid has taken place, the progress of which can be determined with the aid of a residual oxygen content measurement, does the discharge device (40) open and the separated material (102) reach, e.g., a transport vessel (48).

A line (26) controlled by means of a valve (23') can be used to clean the filter (50) by means of a counter blow at a given time. Said line can be used to feed optional additional inert fluid during the aforementioned inertization process.

Figure 2:
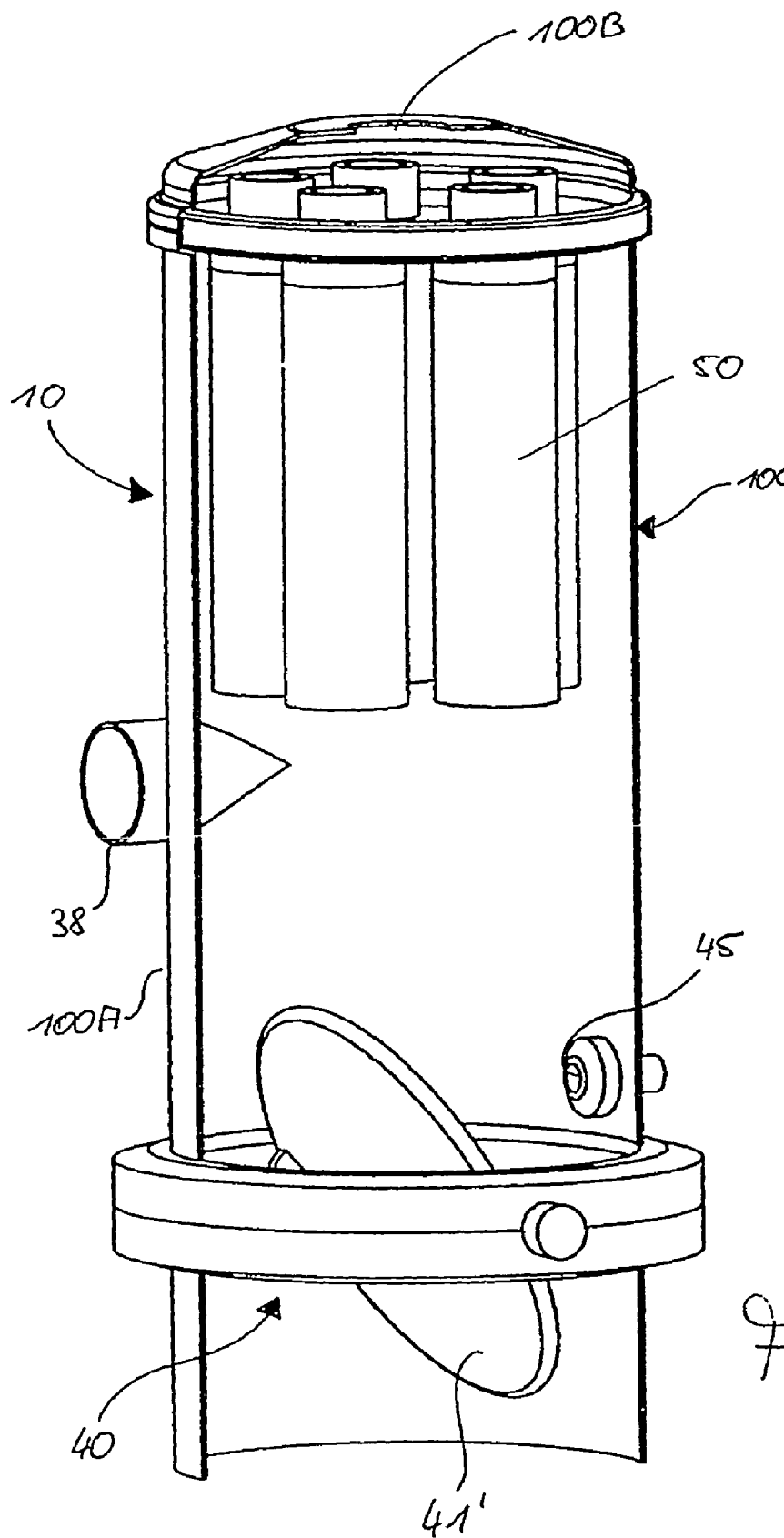
FIG. 2 A three-dimensional partial section view of a vacuum conveyor with completely cylindrical separating vessel and with feeding means in the vessel wall and also a discharge lid in the form of a disk valve.

Represented in FIG. 2 is a simplified three-dimensional partial section view of a modified embodiment of an empty vacuum conveyor (10), for which the separating vessel (100) is of a completely cylindrical configuration and does not feature any narrowing, particularly in the area in which the feeding means are provided. However, said embodiment is to be recommended, in particular, not only for a smaller vessel having a diameter of up to 450 mm. Represented in addition is a modified discharge lid (41), composed of a disk valve having an essentially centrally arranged shaft by which said sealing plate is mounted in a pivoting manner on the discharge device (40). The feeding means are arranged in the vessel wall (100A) above the discharge device (40). The filter (50) delimiting the interior space of the separating vessel (100) to the outlet (100B) is configured in the embodiment as a multitude of individual filter units, such as filter cartridges or filter bags. Additional details, such as valve controls, can be inferred analogously to FIG. 1.

Figure 3:
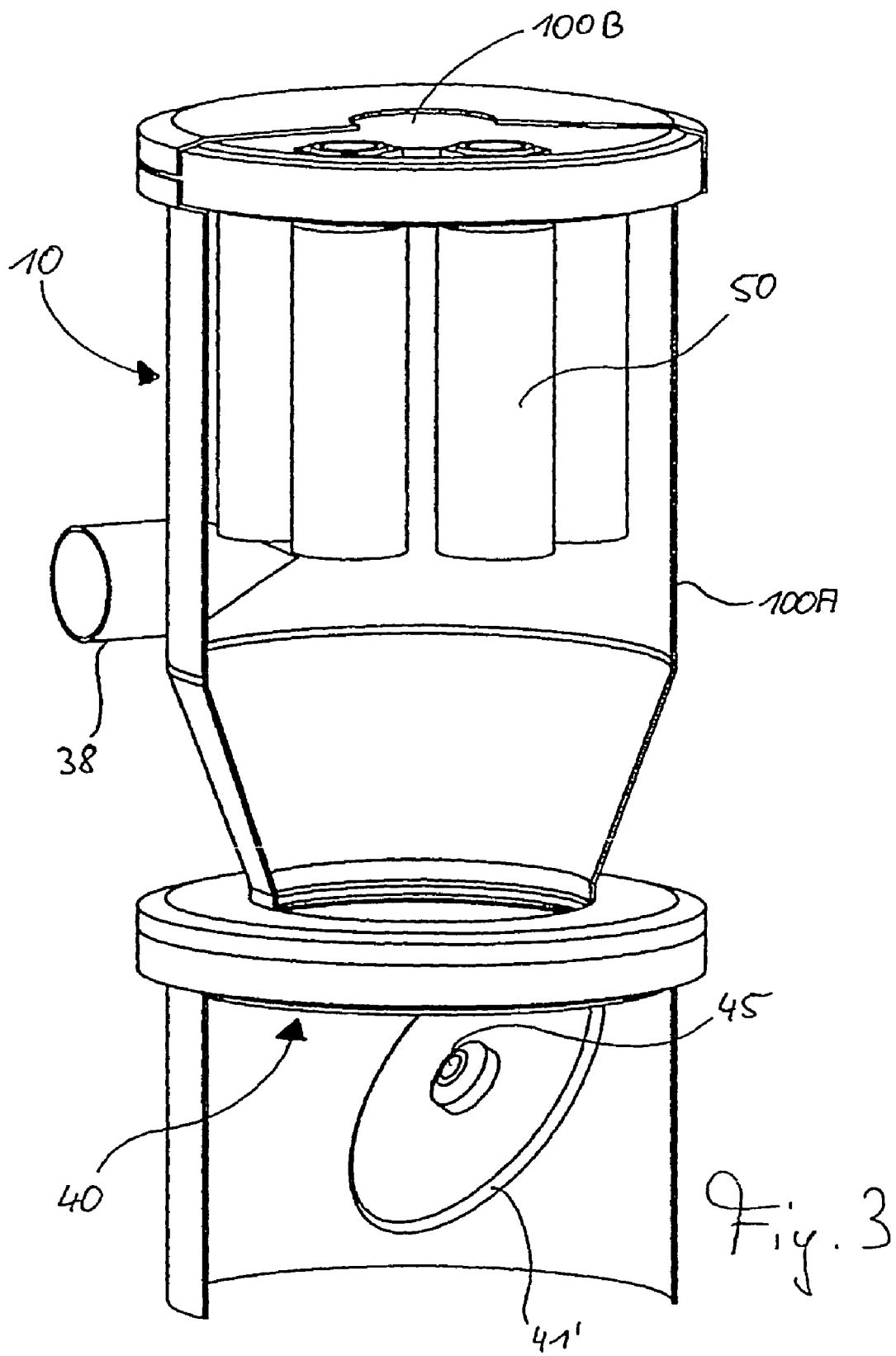
FIG. 3 A three-dimensional partial section view of a vacuum conveyor with separating vessel inclined diagonally in a downward direction and having a feeding means incorporated in a lid opening at one side.

FIG. 3 shows a simplified three-dimensional partial section view of an additional embodiment for which the lower region of an empty separating vessel (100) narrows in a downward direction. However, an embodiment of this type is not recommended, in particular, exclusively for a larger vessel having a diameter of at least 450 mm. A value of 30-75° has been proven to be preferable as the aperture angle for the funnel-shaped area, with greater or smaller values also falling within the sense of the invention. As an additional feature of the present invention, the feeding means are arranged in the discharge lid (41) for this embodiment, with said feeding means being mounted, as represented, on one side of the discharge device (40). Additional details, such as valve controls, again, can be inferred analogously to FIG. 1.

List Of Reference Numbers
10 Vacuum conveyor
20 Vacuum pump device
23, 23', 29 Valve
22, 24, 26, 28 Line
30 Intake device
32 Line
34, 34' Valves
36 Material to be taken up
38 Intake opening
40 Discharge device
40A Discharge opening
41 Discharge lid
41' Discharge lid (open)
42, 44 Line
43, 43' Valve
45, 46 Fluidizing nozzles
48 Transport vessel
50 Filter
100 Separating vessel
100A Vessel wall
100B Outlet opening
102 Separated material
102A Surface of bed
103 Surface of separated material
104 Fluid presenting residual oxygen

The invention claimed is:

1. Method for rendering a vacuum conveyor inert, the conveyor comprising a separating vessel (100), at least one intake opening (38) to the separating vessel, a discharge device (40) including a discharge opening (40A) and a discharge lid (41) that pivots between an opened and a closed position relative to said discharge opening (40A), and a vacuum pump device (20) for establishing a vacuum within the separating vessel (100) in order to intake material into said separating vessel, said method comprising:

while said discharge lid (41) is closed, operating said vacuum pump device (20) to intake material entrained in a conveying gas into said separating vessel (100) by way of said intake opening (38) of the separating vessel, separating said material from said conveying gas within said separating vessel, and collecting said separated material in a lower region of said separating vessel;

performing an inertization step within said separating vessel while said discharge lid is closed; and, after said inertization step, performing a discharging step using said discharge device (40) to discharge said separated material from said separating vessel through said discharge opening (40A) by pivoting said discharge lid (41) to its opened position to open said discharge opening (40A), said inertization step comprising feeding an inert fluid into the separating vessel (100) below a free surface (102A) of separated material (102) in proximity to the discharge opening (40A), and flowing said inert fluid upwardly through said separated material collected in said lower region of said separating vessel (100) and out of said separating vessel to displace residual oxygen from said separating vessel, wherein the inert fluid is fed into the separating vessel (100) by means of a line (44, 45) which is valve-controlled (43, 43') and the inert fluid flows through the separated material before flowing through a filter (50) that is also located in the separating vessel (100), and said inert fluid exits the separating vessel (100) through an outlet opening (100B) of the separating vessel after flowing through said filter, said filter located between said intake opening (38) and said outlet opening (100B);

wherein during said inertization step, said method comprises using said vacuum pump device (20) to produce a pressure in said separating vessel (100) that is lower than a pressure of the inert fluid being fed into the separating vessel (100) while said discharge lid (41) is closed.

2. Method for inertization according to claim 1, further comprising switching off said vacuum pump device (20) and feeding the inert fluid under pressure into the separating vessel (100) when the vacuum pump device is switched off after said step of using said vacuum pump device (20) to produce a pressure in said separating vessel (100) that is lower than a pressure of the inert fluid being fed into the separating vessel (100).

3. Method for inertization according to claim 1, wherein said inertization step comprises a continuous feeding of the inert fluid and simultaneous continuous evacuation of the separating vessel (100).

4. Method for inertization according to claim 1, further comprising determining a concentration of oxygen in the fluid (104) present in the separating vessel (100).

5. Method for inertization according to claim 4, further comprising a second inertization step that occurs as part of said discharging step when said discharge lid (41) is in its opened position, said second inertization step comprising conducting a flow of inert fluid through said filter, from the direction of a clean gas side of said filter toward said discharge opening (40A), wherein said second inertization step occurs during discharge of the separated material via said discharge opening (40A).

6. Vacuum conveyor that can be rendered inert, said vacuum conveyor comprising:
a separating vessel (100) including a vessel wall (100A), an inlet opening (30) located in the vessel wall (100A) to intake material into the separating vessel, an outlet opening (100B) for exhaust of fluid from said separating vessel, and a discharge opening (40A) for emptying separated particulate material from said separating vessel (100),
a filter located inside the separating vessel between the inlet opening and the outlet opening,
a discharge device (40) for emptying separated particulate material from said separating vessel through said discharge opening (40A), said discharge device (40) comprising a movable discharge lid (41) that moves between an opened position for opening said discharge opening (40A), and a closed position for closing said discharge opening (40A),
a vacuum pump device (20) to establish a vacuum at said outlet opening in order to intake material into the separating vessel via said inlet opening, and
means for feeding inert fluid into the separating vessel, said means for feeding inert fluid comprising fluidizing nozzles provided in the separating vessel (100) below an anticipated level of a free surface (103) of the material (102) to be separated and located proximate the discharge device, wherein said means for feeding inert fluid are adapted to feed said inert fluid into said separating vessel, through said separating vessel, through said filter, and out of said separating vessel via said outlet opening when the separating vessel has a differential pressure that is lower than a pressure of said inert fluid;
wherein at least one of said fluidizing nozzles (45) for feeding inert fluid into the separating vessel is connected to the movable discharge lid (41).

7. Device according to claim 6, further comprising:
lines (42, 44) leading to the feeding means; and,
valves (43, 43') that control the lines leading to the feeding means.

8. Device according to claim 6, wherein the feeding means further comprise at least one of said fluidizing nozzles (45,46) connected to said vessel wall (100A) of the separating vessel (100) in proximity to said discharge opening 40A.

9. Device according to claim 8, wherein the vessel wall (100A) in a region proximate said discharge opening (40A) comprises an inclined diagonal progression downward that leads to said discharge opening (40A), and wherein at least one of said fluidizing nozzles (45,46) is connected to said inclined diagonal progression of said vessel wall.

10. Device according to claim 8, wherein the vessel wall (100A) proximate the discharge opening (40A) comprises a cylinder without narrowing, and said fluidizing nozzles (45, 46) are connected to said cylinder of said vessel wall (100A) proximate the discharge opening (40A).

11. Device according to claim 8, wherein said feeding means comprise a plurality of said fluidizing nozzles (45,46) arranged in a ring structure around said vessel wall (100A).

12. Method for rendering a vacuum conveyor inert, the conveyor comprising a separating vessel (100), at least one intake opening (38), a discharge device (40) including a discharge opening (40A) and a discharge lid (41) that moves relative to said discharge opening between an opened position and a closed position, and a vacuum pump device (20) to establish a vacuum in order to intake material into said separating vessel, said method comprising:
operating said vacuum pump device (20) to intake material entrained in a conveying gas into said separating vessel (100) by way of the intake opening (38) of the separating vessel, separating said material from said conveying gas within said separating vessel, and collecting said separated material in a lower region of said separating vessel when said discharge lid (41) is in its closed position to close said discharge opening (40A);
performing a first inertization step within said separating vessel; and,
after said first inertization step, performing a discharging step using said discharge device (40) to discharge said separated material from said separating vessel, said discharging step comprising pivoting said discharge lid (41) from its closed position to its opened position relative to said discharge opening (40A) such that said separated material collected in said lower region of said separating vessel (100) exits said separating vessel by falling through said discharge opening (40A),
said first inertization step comprising feeding an inert fluid into the separating vessel (100) below a free surface (102A) of separated material (102) while said discharge lid (41) is in its closed position relative to said discharge opening (40A) and flowing said inert fluid through said separated material and out of said separating vessel to displace residual oxygen from said separating vessel, wherein the inert fluid is fed into the separating vessel (100) by means of a line (44, 45) which is valve-controlled (43, 43') and the inert fluid flows through the separated material before flowing through a filter (50) that is also located in the separating vessel (100), and said inert fluid exits the separating vessel (100) through an outlet opening (100B) of the separating vessel after flowing through said filter, said filter located between said intake opening (38) and said outlet opening (100B);

said method further comprising a second inertization step that occurs after completion of said first inertization step and during said discharging step, said second inertization step comprising conducting a flow of inert fluid through said filter from a clean gas side of said filter that is oriented toward said outlet opening (100B) toward said discharge opening (40A) when said discharge lid (41) is in its opened position relative to said discharge opening (40A) and while said separated material is being discharged from said separating vessel through said discharge opening.

13. Method for inertization according to claim 4, wherein said step of determining said concentration of oxygen in the fluid (104) present in the separating vessel (100) comprises determining said concentration of oxygen on a clean gas side of said filter (50).

14. Method for inertization according to claim 13, wherein said method further comprises initiating said discharging step only after said concentration of oxygen indicates completion of said inertization step.

\* \* \* \* \*